(No Model.) 6 Sheets—Sheet 6.
J. COYNE.
MACHINE FOR SHAPING SLEEVE NUTS, &c.
No. 554,481. Patented Feb. 11, 1896.
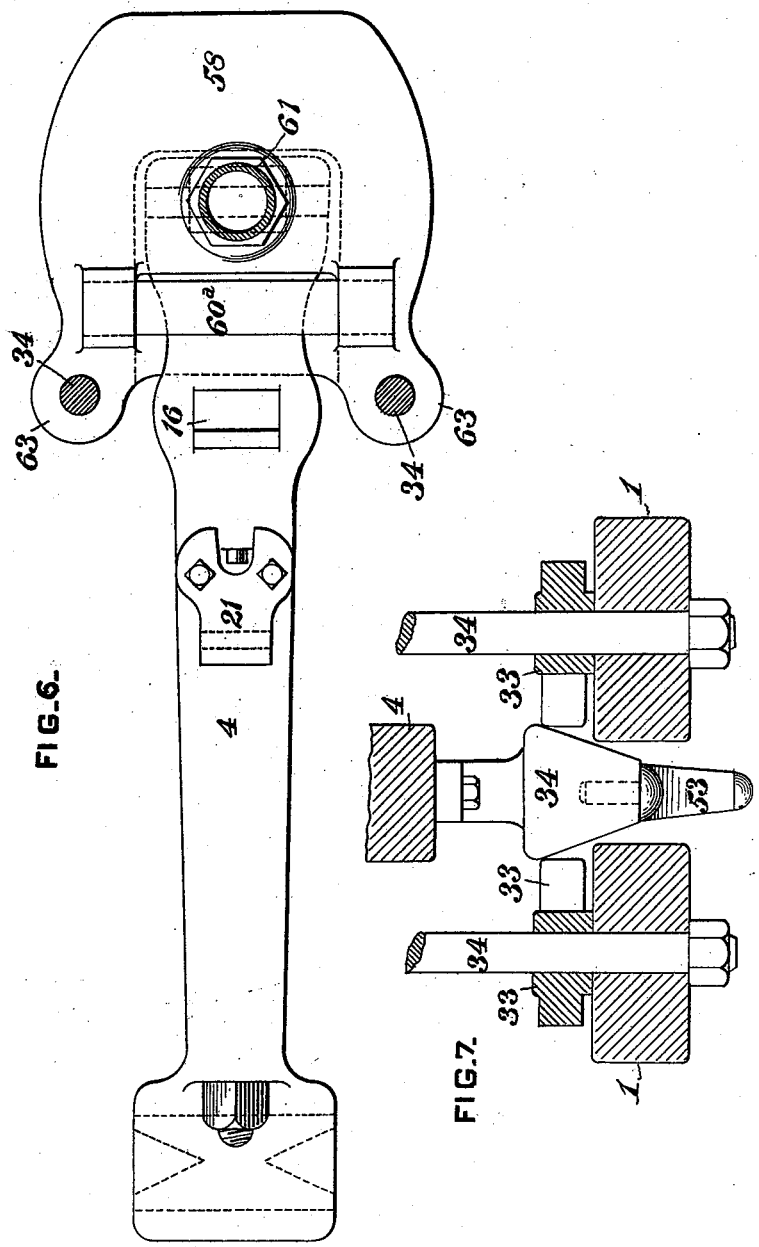
WITNESSES:
Dawson S. Wolcutt
F. E. Gaither
INVENTOR,
John Coyne
by George H. Christy
Att'y.

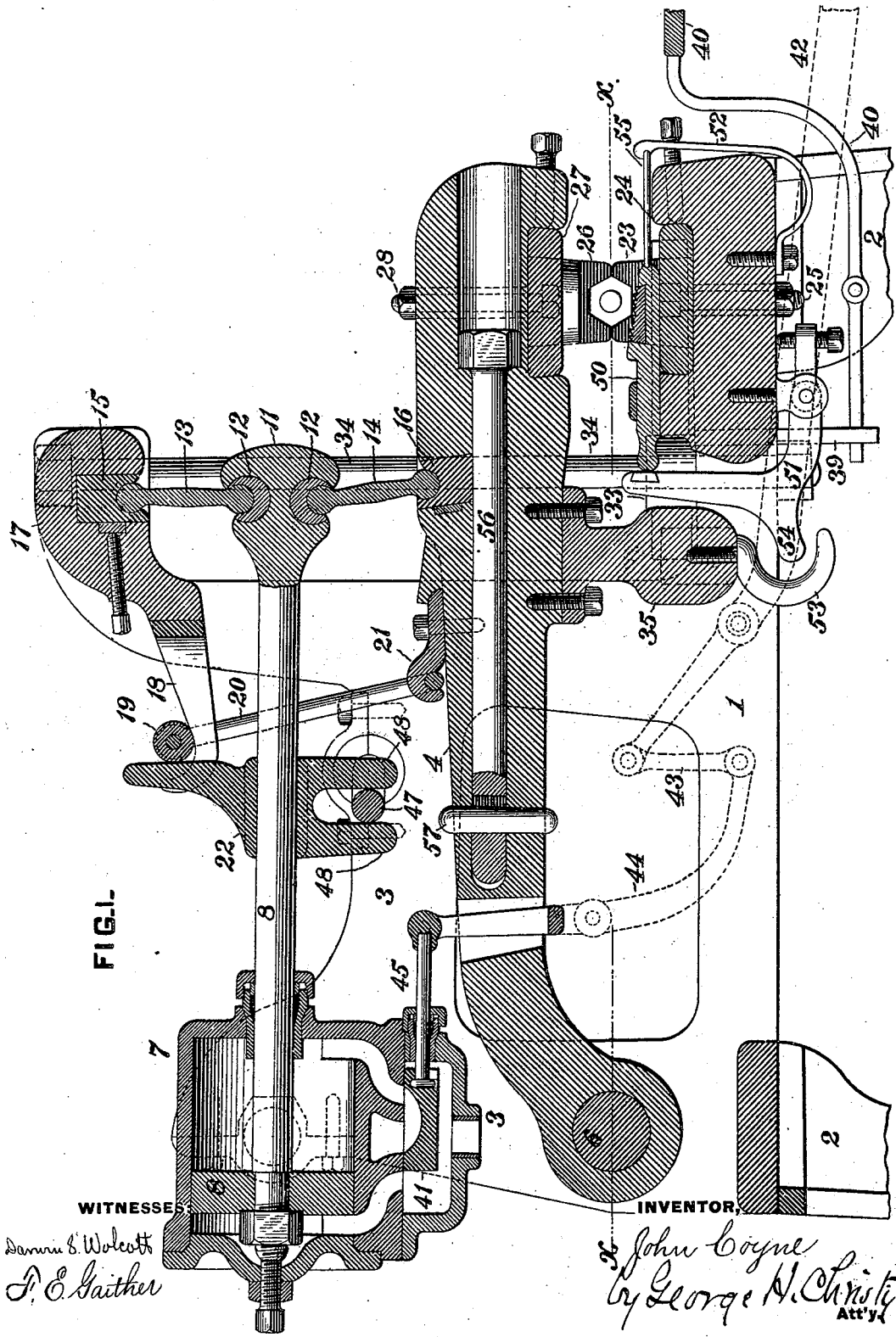

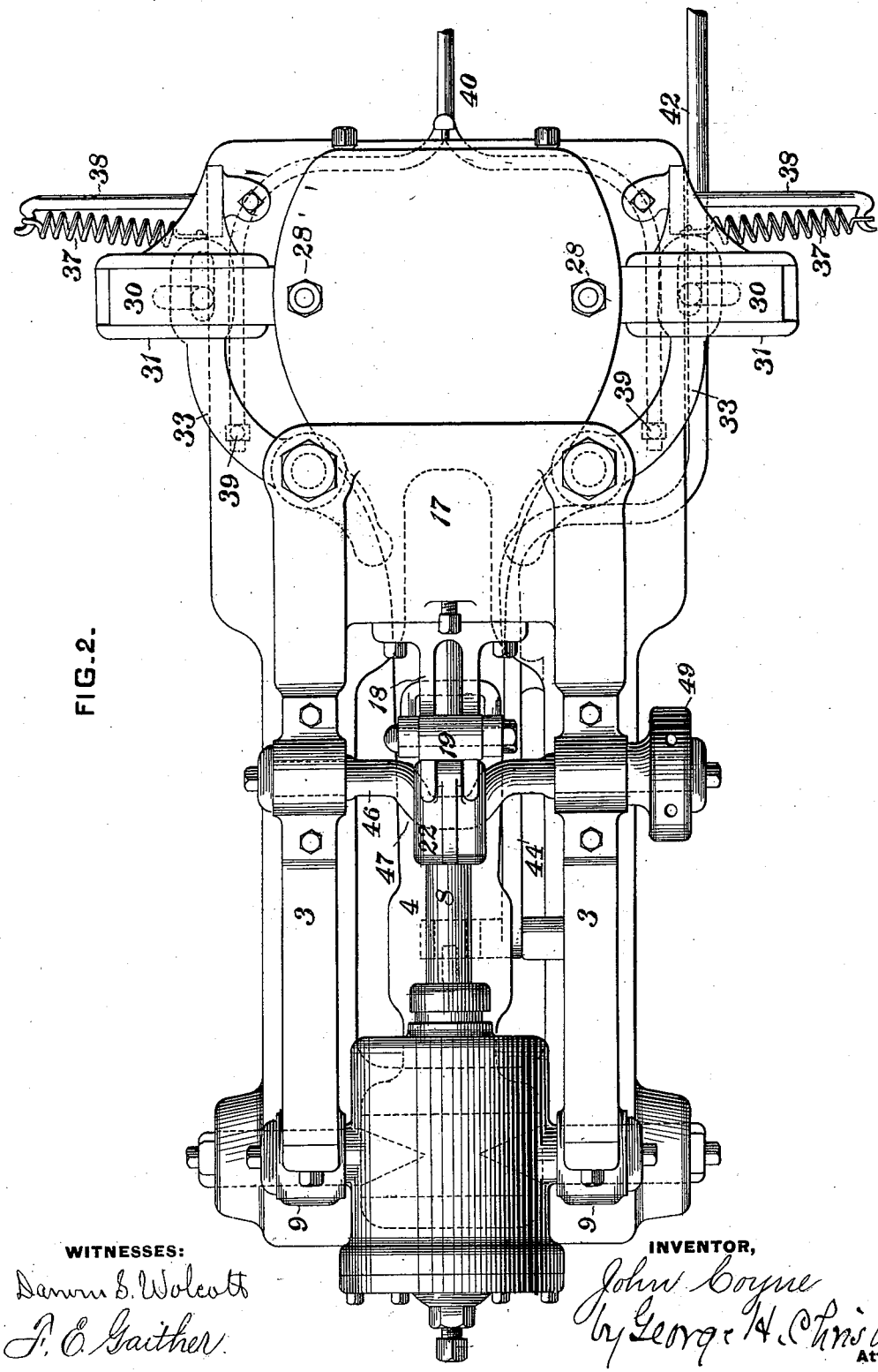

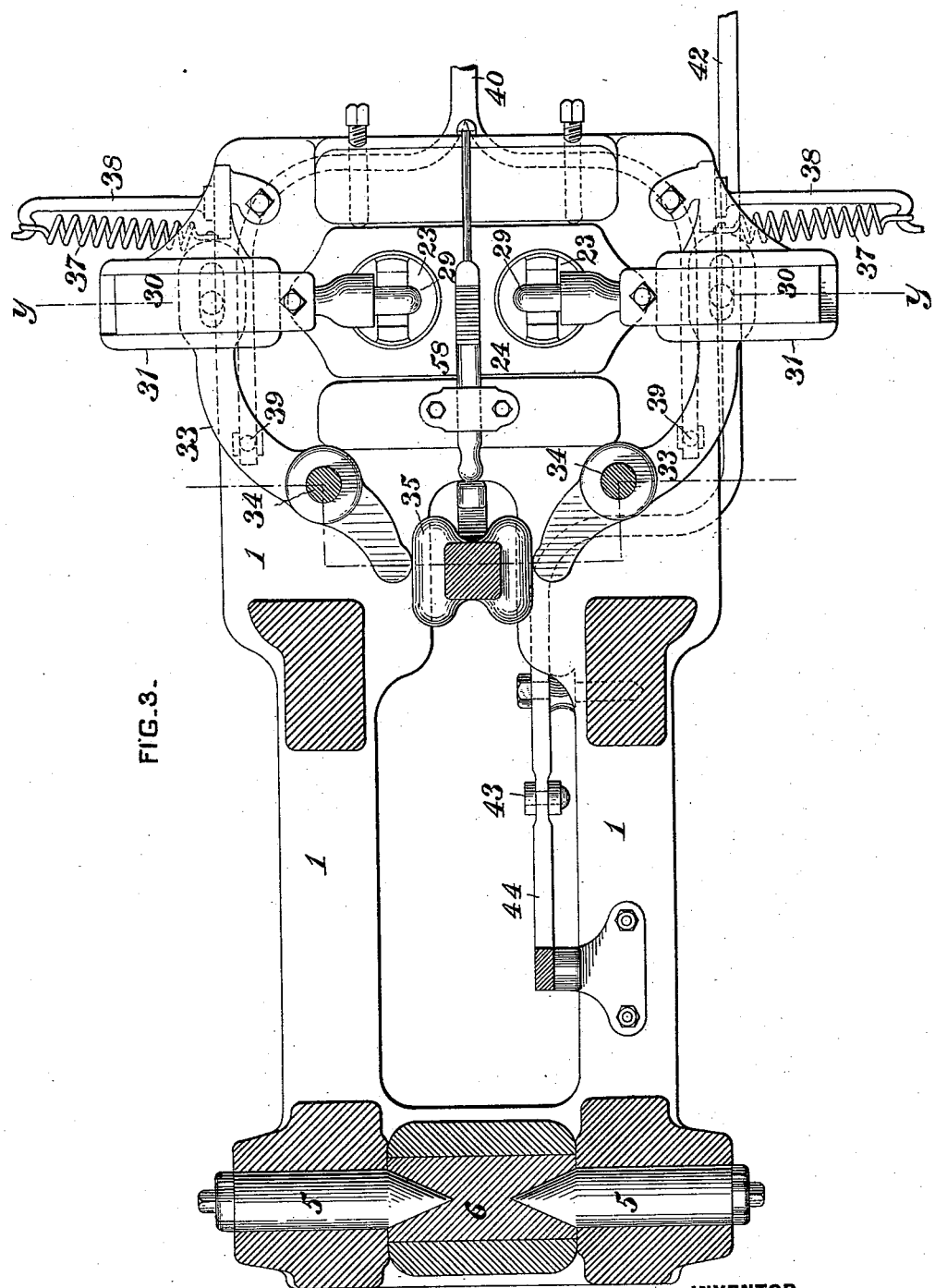

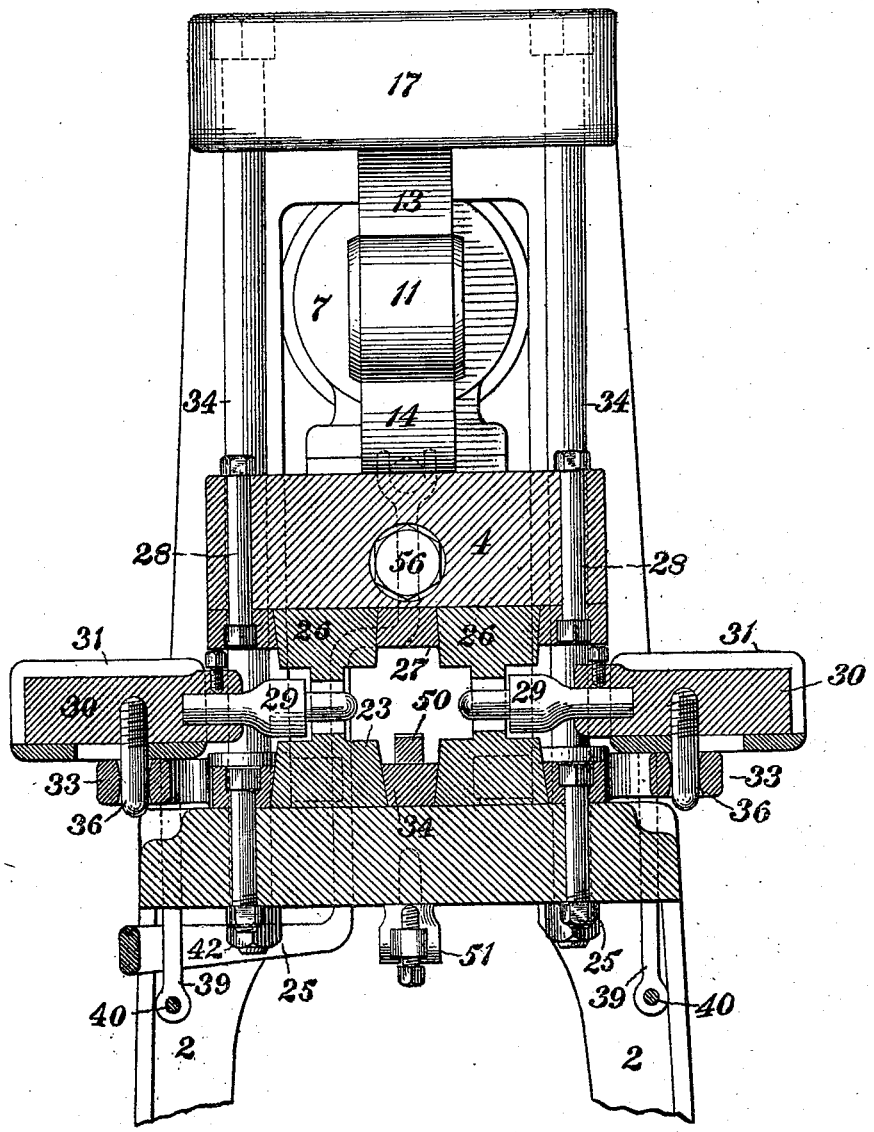

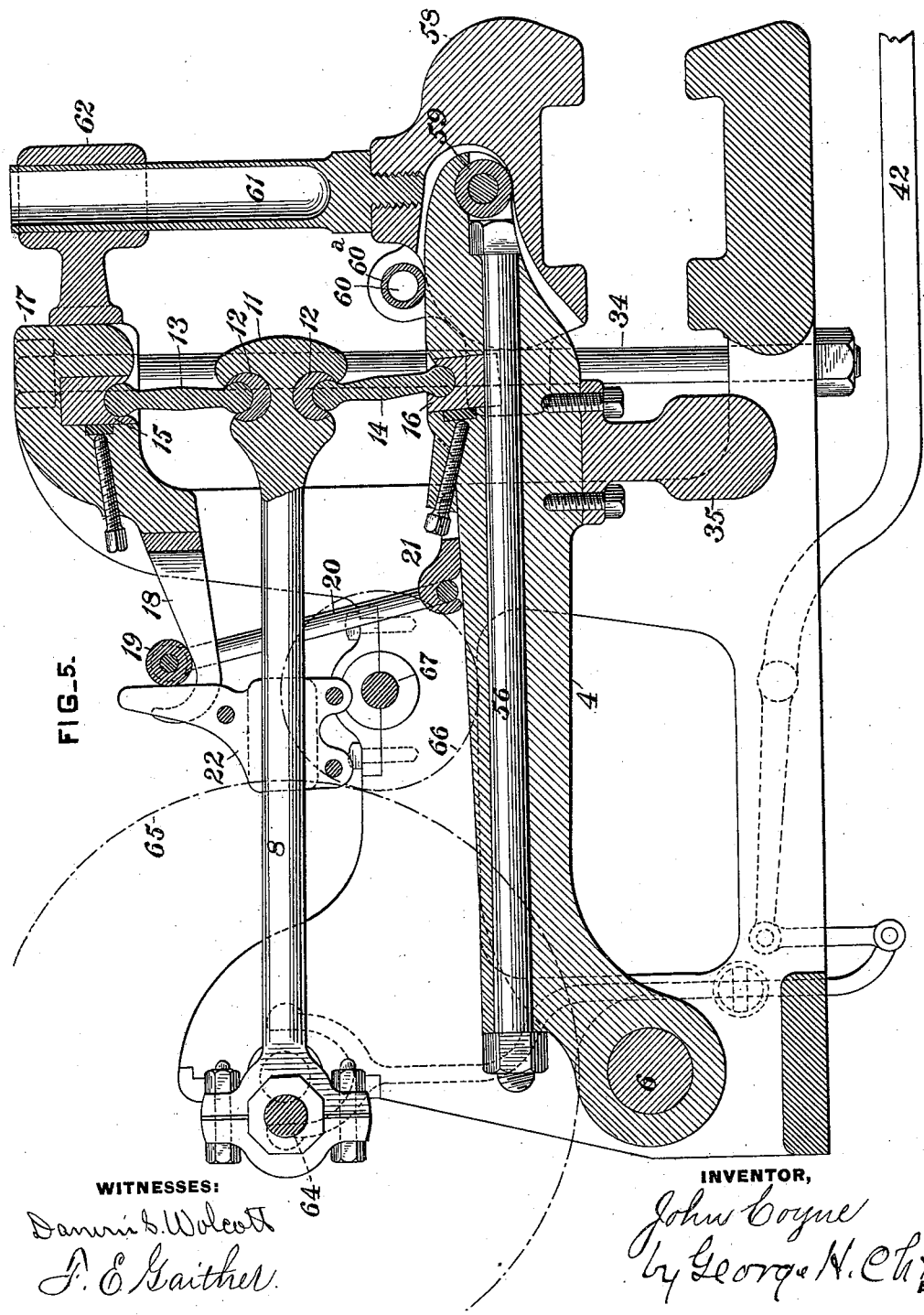

UNITED STATES PATENT OFFICE.

JOHN COYNE, OF PITTSBURG, PENNSYLVANIA.

MACHINE FOR SHAPING SLEEVE-NUTS, &c.

SPECIFICATION forming part of Letters Patent No. 554,481, dated February 11, 1896.

Application filed June 16, 1893. Serial No. 477,830. (No model.)

*To all whom it may concern:*

Be it known that I, JOHN COYNE, a citizen of the United States, residing at Pittsburg, in the county of Allegheny and State of Pennsylvania, have invented or discovered certain new and useful Improvements in Machines for Shaping Sleeve-Nuts, &c., of which improvements the following is a specification.

The invention described herein relates to certain improvements in mechanism for forming or shaping by compression articles of metal, &c., such as sleeve-nuts, &c., and has for its object a construction whereby a powerful compressive action may be produced with a comparatively small force.

In general terms the invention consists in the construction and combination substantially as hereinafter described and particularly claimed.

In the accompanying drawings forming a part of this specification, Figure 1 is a sectional elevation of my improved press. Fig. 2 is a top plan view of the same. Fig. 3 is a sectional view, the plane of section being indicated by the line $x\, x$, Fig. 1. Fig. 4 is a similar view to Fig. 1, the plane of section being indicated by the line $y\, y$, Fig. 3. Fig. 5 is a view similar to Fig. 1, illustrating certain modifications in the driving mechanism. Fig. 6 is a top plan view of the helve-lever, and Fig. 7 is a detail view of the wedge-cam, for operating the arms that move the mandrels.

In the practice of my invention the bed 1 of the machine is mounted on suitable supports 2 and is provided on its upper face with side pieces 3, preferably formed integral with the bed-piece. The helve-lever 4 is supported at its rear end by conical pins 5 passing through the side pieces and entering female conical bushing 6 in the rear end of the lever. The fluid-pressure cylinder 7 is provided with suitable trunnions which are mounted in suitable bearings 9 in the side pieces at the rear end of the machine. The piston-rod 8 extends forward and is provided with enlarged head 11 having suitable bushed seats 12 for the reception of the ends of the struts 13 and 14, the outer ends of these struts having bearings upon the blocks 15 and 16, arranged, respectively, in the cross-piece 17 of the frame of the machine and the helve-lever 4. The cross-piece 17, which serves as an abutment, receiving the thrust of the operating mechanism is provided with a rearwardly-extending arm 18, forming a bearing for the friction-roller 19, in one end of the link 20, the opposite end of said link being attached to the helve-lever by a hook 21. This link and the arm 18 serve to support the helve-lever and to cause it to move upward as the head 11 of the piston-rod is moved to the right of Fig. 1.

It will be observed that the upper face of the arm or horn 18 is inclined, so that as the friction-roller 19 on the upper end of the link is moved to the right in Fig. 1 by the shifting-block 22, secured to the piston-rod 8, the helve-lever will be raised, thereby keeping the struts 13 and 14 in place in their bearing-blocks. In the front end of the bed 1 is formed a recess for the reception of the stationary shaping-dies, in the present instance for the dies 23, which are adapted to impart a hexagonal shape to the ends of the tube which is to form a sleeve-nut. These dies 23 have cone-shaped side walls, as shown in Figs. 1 and 4, and are held in place by a plate 24 having suitably-shaped openings for the passage of the dies 23 therethrough, and are held in position in the recess in the bed 1 by bolts 25. The corresponding movable dies 26 are similarly held in a recess within the head of the helve-lever 4 by a plate 27 and bolts 28.

In making sleeve-nuts and other like hollow articles it is necessary to preserve the shape and size of the opening in or through the article. To this end mandrels 29 are secured in suitable slides 30, mounted in ways 31 on the sides of the machine and adapted to be moved in and out by levers 33. These levers are pivotally mounted on vertical rods 34, passing through the headpiece 17 and the bed 1 and serving not only as pivots to the levers 33, but also as braces for the headpiece 17, to prevent a rupture of the same by the heavy upward strains to which it is subjected during the operation of the machine. The rear ends of the levers 33 are arranged to be operated upon and forced outwardly by a wedge-block 35, secured to the under side of the helve-lever 4 as the latter descends, thereby forcing the slides 30 with their mandrels 29 inward.

As shown in Fig. 4, the outer ends of the levers 33 are connected to the slides 30 by pins 36 passing through slots shown in the outer ends of the levers 33 into the slides 30, the under sides of the guides 31 being suitably slotted to permit of the movement of the pins 36. To the outer ends of the levers 33 are connected the inner ends of the springs 37, their outer ends being connected to standards 38, projecting outwardly from the sides of the bed 1. These springs serve to move the slides and the mandrels outward, when the latter are free to move and the helve-lever is in its elevated position.

In forging some classes of articles it is not generally necessary to remove the mandrels 29 after they have been once placed in position until the exterior of the article has been entirely shaped, or, rather, until each face has been finished. The shaping of certain portions may require one, two, or more blows, and it is necessary that the mandrels should be in position during each blow. To this end I provide a lock, whereby the levers 33, and with them the slides 30 and mandrels 29, are held in position within the article after they have been once forced there by a downward movement of the helve-lever. This locking mechanism consists of pins 39, which pass upward through the bed 1 and enter holes in the levers 33 when the mandrels have been forced into position in the tube. These pins are operated by a lever 40, having its handle end extended out to the front of the machine.

The admission of fluid-pressure into the cylinder 7 is regulated by a valve 41, which is operated, as desired, by a lever 42 pivoted to the bed 1 and having its handle end extending to the front of the machine. The inner end of this lever is connected by a link 43 to another lever 44 connected in turn by a pin 45 to the valve.

It is frequently desirable to provide for a slow, partial or entire upward movement of the helve-lever for the purpose of putting in new dies, for repairs, and for adjustments. For this purpose a shaft 46 is arranged in suitable bearings across the machine, and is provided with a crank 47, adapted to engage fingers 48, projecting downwardly from the shifting block 22. On one end of this shaft is secured suitable means—as, for example, a disk 49—provided with holes for the reception of capstan-bars, whereby the shaft may be rotated, and thereby through the medium of the crank 47 and the fingers 48, shifting-block and piston-rod may be shifted to the right and the helve-lever raised.

For the purpose of giving a partial rotation to the article being forged, a slide 50 is mounted in suitable ways transversely of the recess in which the dies are arranged, and is provided with inclined upper face provided with serrations for engagement with the articles operated on and the consequent rotation thereof, as the slide is moved to the right. This movement of the slide is effected by means of a bent lever 51, pivoted in suitable bearings on the under side of the bed 1, and having one end turned upwardly into line with the slide 50, as shown in Fig. 1. This lever is operated to shift the slide against the action of the spring 52, by a hook or horn 53, on the lower end of the wedge-block 35, engaging a lug 54, projecting from the lever 51. The spring 52 operates on the slide 50 through the medium of a pin 55.

In order to strengthen the helve-lever 4, a longitudinal opening is formed partially or entirely through, and in this opening is placed a bolt 56, drawn tightly to the desired position by a key 57 or a nut. This bolt or shaft will not only strengthen the helve-lever as against transverse strain, but will also prevent portions thereof from dropping down and injuring the machinery or the workmen in case of a rupture.

In the construction shown in Figs. 5 and 6 the helve-lever is shown provided with a removable head 58 which is provided with a recess into which the end of the helve-lever projects. The head 58 is not attached to the helve-lever, but is held as against movement longitudinal of the helve-lever by the vertical rods 34, which pass through suitable openings in wings 63 on the head 58, and so serve not only to hold the head in position as regards the helve-lever, but also as guides to maintain the head in a horizontal position. The front end of the helve-lever is provided with a friction-roller 59 adapted to bear upon the curved bottom wall of the recess in the head 58, and thereby reduce the friction due to angular movements of the helve-lever and head as they are moved up and down. The head is prevented from vertical movement independent of the helve-lever by a bolt 60 passing through the head above the lever and provided with a friction-roller 60$^a$ bearing upon the lever. The head 58 is provided with a vertical pin 61, passing through a guide 62 on the cross-piece 17. This pin serves to maintain the head in a horizontal position during its vertical movement. A helve-lever 4, provided with a movable head 58, may be employed in the construction shown in Fig. 1.

In lieu of the fluid-pressure cylinder 7 for operating the helve-lever, a crank-shaft 64, such as shown in Fig. 5, may be employed. In this construction the rod 8 is connected to the crank, so as to impart a back-and-forth movement thereto similar to that imparted by the piston of the fluid-pressure cylinder. On one end of the shaft 64 is secured a large gear-wheel 65, as indicated in dotted lines, driven by a smaller gear-wheel 66, also indicated by dotted lines, on the power-shaft 67. As is generally the case in all power-presses, the driving-wheel 65 is loosely mounted upon the shaft 64 and is constructed so as to be coupled therewith by a suitable clutch mechanism, which is operated by means of the lever 42, employed for shifting the valve of the fluid-pressure cylinder in the construction shown in Fig. 1.

I claim herein as my invention—

1. In a power-press, the combination of a pivoted helve-lever, an abutment, a reciprocating head arranged between the abutment and helve, struts bearing at their inner ends against the reciprocating head and at their outer ends against the abutment and the helve respectively, and means actuated by the reciprocating head for raising the helve, substantially as set forth.

2. In a power-press, the combination of a pivoted helve-lever, a cross-piece or abutment arranged above said helve, a reciprocating head arranged between the abutment and the helve, struts bearing at their inner ends against the reciprocating head and at their outer ends against the abutment and helve respectively, inclined arms, and a link movable along the arms and connected to the helve-lever, substantially as set forth.

3. In a power-press, the combination of a pivoted helve, inclined arms arranged above the helve, a link movable along the arms and connected to the helve and a movable block arranged to move one end of the link along the inclined arms, substantially as set forth.

4. In a power-press, the combination of a pivoted helve, a head movably attached to the helve, an abutment, a reciprocating head arranged between the helve and abutment, struts bearing at their inner ends against the head and at their outer ends against the abutment and helve respectively, and guides for holding the movable head from tipping or oscillation during its vertical movements, substantially as set forth.

5. In a power-press, the combination of a pivoted helve-lever, slides movable toward and from each other, levers having one end connected to the slides and a wedge movable with the helve and adapted to force the free ends of the slide-levers apart, substantially as set forth.

6. In a power-press, the combination of a pivoted helve-lever, slide actuated by said lever, and adapted to engage and rotate the article being operated on during the upward movement of the helve-lever, substantially as set forth.

7. In a power-press, the combination of a pivoted helve-lever and abutment, and reciprocating head arranged between the abutment and helve, trusses bearing at their inner ends against the reciprocating head and at their outer ends against the abutment and helve respectively, and positively-operating means for raising the helve, substantially as set forth.

In testimony whereof I have hereunto set my hand.

JOHN COYNE.

Witnesses:
DARWIN S. WOLCOTT,
E. J. SMAIL.